United States Patent [19]

Robinson

[11] Patent Number: 4,992,856
[45] Date of Patent: Feb. 12, 1991

[54] COLOR TELEVISION DECODER FOR SEPARATING CHROMINANCE SIGNALS FROM A COLOR SIGNAL

[75] Inventor: Roger N. Robinson, Windsor, Great Britain

[73] Assignee: Vistek Electronics Limited, United Kingdom

[21] Appl. No.: 378,438

[22] Filed: Jul. 10, 1989

Related U.S. Application Data

[63] Continuation of Ser. No. 99,229, Sep. 21, 1987, abandoned.

[30] Foreign Application Priority Data

Sep. 19, 1986 [GB] United Kingdom ............... 8622680

[51] Int. Cl.⁵ .................................................. H04N 9/78
[52] U.S. Cl. ................................................. 358/31
[58] Field of Search ..................................... 358/31

[56] References Cited

U.S. PATENT DOCUMENTS

| 4,141,035 | 2/1979 | Maxemchuk et al. | 358/31 |
| 4,345,268 | 8/1982 | Clarke | 358/31 |
| 4,688,080 | 8/1987 | Wagner | 358/31 |

FOREIGN PATENT DOCUMENTS

| 153034 | 8/1985 | European Pat. Off. | 358/31 |
| 161923 | 11/1985 | European Pat. Off. | 358/31 |
| 129892 | 8/1983 | Japan | 358/31 |
| 77782 | 5/1984 | Japan | 358/31 |
| 62292 | 4/1985 | Japan | 358/31 |
| 139090 | 7/1985 | Japan | 358/31 |
| 2488 | 1/1986 | Japan | 358/31 |
| 18285 | 1/1986 | Japan . | |
| 41290 | 2/1986 | Japan . | |
| 141294 | 6/1986 | Japan . | |
| 133886 | 6/1987 | Japan . | |
| 2016239 | 9/1979 | United Kingdom | 358/31 |
| 2067872 | 7/1981 | United Kingdom | 358/31 |
| 2078054 | 12/1981 | United Kingdom | 358/31 |
| 2079091 | 1/1982 | United Kingdom | 358/31 |
| 2125246 | 2/1984 | United Kingdom . | |
| 2170975 | 8/1986 | United Kingdom . | |

OTHER PUBLICATIONS

English translation of Japan 139090 (Kondou).
British Broadcasting Corp., Designs Dept. Technical Memorandum No. 1.188(84), "Transversal Filters for PAL Decoders", published in 1984.

*Primary Examiner*—John W. Shepperd

[57] ABSTRACT

A color television decoder is provided for separating chrominance signals from a color video signal. The decoder has a variable two dimensional finite impulse response filter, comprising delay lines which provide signals representing an array of picture points around the picture point being imaged, and a variable combiner which linearly combines the signals with variable coefficients. A picture analyzer analyzes the picture and controls the variable coefficients so as to control the filter response to separate the chrominance signal. The luminance signal may be separated by subtracting the chrominance signal from the delayed color video signal.

29 Claims, 9 Drawing Sheets

COLOR TELEVISION DECODER FOR SEPARATING CHROMINANCE SIGNALS FROM A COLOR SIGNAL

This is a continuation of Application Ser. No. 07/099,229 filed on Sept. 21, 1987, now abandoned.

BACKGROUND OF THE INVENTION

A. Field of the Invention

The present invention relates to a colour television decoder. Such a decoder may be used for decoding PAL and NTSC colour television signals to provide separate colour components, i.e. either red green and blue (RGB) or luminance (Y) and R-Y (V) and B-Y (U) colour difference signals, for the purpose of direct display of a television picture or for the purpose of processing the decoded signal, possibly before re-encoding into a similar or different system such as PAL, NTSC, SECAM, C-MAC or other format.

B. Description of the Prior Art

The colour information in the PAL or NTSC system is transmitted as a modulation of a subcarrier signal added to the luminance signal. The modulated colour subcarrier is herein referred to as the chrominance signal.

In a conventional PAL or NTSC decoder, the chrominance signal is removed from the input signal to provide luminance by the use of a notch (band-stop) filter designed to suppress the colour subcarrier frequency and also reduce the amplitude of the sidebands generated as a result of its modulation. In practice, the design of this band-stop filter is a poor compromise between adequately suppressing the unwanted chrominance and undesirably suppressing the wanted luminance information at frequencies near to the subcarrier. Inadequate suppression of the chrominance signal results in a fine dot pattern on the displayed luminance signal commonly known as cross-luminance.

The chrominance information in such a conventional decoder is separated from the input signal by bandpass filter designed to select the colour subcarrier and its associated side-bands but reject as far as possible the luminance signal. Again the compromise is unsatisfactory and much unwanted luminance information passes into the chrominance path where it is decoded to produce spurious colour effects commonly known as cross-colour.

A commonly used technique to reduce cross-colour in a PAL decoder is known as delay line decoding. In this type of decoder, the chrominance signal on one line is combined with the chrominance from the previous line which has been delayed by a period of one line plus or minus a period of one quarter of a subcarrier cycle. This technique reduces cross-colour but because of the line averaging also reduces vertical colour resolution. In addition, because of the offset of one quarter of a cycle of subcarrier, horizontal colour resolution is also reduced.

In a comb-filter decoder, cross-colour may be reduced and loss of resolution in vertical luminance is also improved. The comb filter decoder however produces unsatisfactory decoding where the picture contains significant colour changes from one television line to the next. The colour subcarrier is then not adequately suppressed in the luminance output and the vertical resolution of the chrominance outputs is impaired.

Adaptive decoders of the type described in U.K. Patent Application No. 8501305 Ser. No. 2153624A attempt to overcome these limitations by changing the response of the decoder from a comb filter to one incorporating a notch filter if a change in colour from one line to the next exceeds a fixed threshold. This technique improves the decoder performance where distinct colour changes occur as in some electronically generated pictures, but frequently fails to operate adequately on pictures containing more random changes in luminance information or where a more gradual change in picture colour occurs in a scene.

SUMMARY OF THE INVENTION

According to the invention, there is provided a colour television decoder, comprising a variable two dimensional finite impulse response filter for receiving an input colour video signal and for supplying a chrominance signal, and first control means for controlling the variable filter in accordance with picture information represented by the input colour video signal.

Preferably the variable filter comprises first delay means for providing a plurality of signals representing a two dimensional pattern of picture points and first variable combining means for linearly combining the plurality of signals in proportions controlled by the first control means.

Preferably the output of the variable filter is connected to a first input of first subtracting means whose second input is connected to the output of second delay means for delaying the input colour video signal so as to provide a luminance signal at the output of the first subtracting means.

Preferably the first delay means includes a first delaying circuit for receiving the input colour video signal and for providing a delay equal to one line period of the input colour video signal, and a second delaying circuit for receiving the output of the first delaying circuit and for providing a delay equal to one line period of the input colour video signal, the decoder further comprising second subtracting means for subtracting the output of the second delaying circuit from the input colour video signal, second and third variable combining means for linearly combining the output of the variable filter with the output of the second subtracting means in variable proportions, and second control means for controlling the variable proportions of the second and third variable combining means in accordance with picture information represented by the input colour video signal. Preferably phase shifting means is provided between the second subtracting means and the second and third variable combining means.

Preferably the first control means comprises a first two dimensional bandpass filter having a pass band centred on predetermined horizontal and vertical spatial frequencies, and having an output connected to a first rectifier. Preferably the first control means further comprises a quadruple two dimensional bandpass filter having first, second, third and fourth pass bands and having an output connected to a second rectifier, and third subtracting means for subtracting the output of the second rectifier from the output of the first rectifier, the first and second pass bands having a horizontal centre frequency less than that of the first two dimensional bandpass filter and the third and fourth pass bands having a horizontal centre frequency greater than that of the first two dimensional bandpass filter, the first and third pass bands having a vertical centre frequency less than that of the first two dimensional bandpass filter and the second and fourth pass bands having a vertical centre frequency greater than that of the first two dimensional bandpass filter.

Preferably the second control means comprises a second two dimensional bandpass filter having a pass band centred on a predetermined horizontal spatial frequency and zero vertical spatial frequency, and having an output connected to a third rectifier. Preferably the second control means further comprises a double two dimensional bandpass filter having fifth and sixth pass bands and having an output connected to a fourth rectifier, and fourth subtracting means for subtracting the output of the fourth rectifier from the output of the third rectifier, the fifth and sixth pass bands having a non zero vertical centre frequency, the fifth pass band having a horizontal centre frequency less than that of the second two dimensional bandpass filter and the sixth pass band having a horizontal centre frequency greater than that of the second two dimensional bandpass filter.

BRIEF DESCRIPTION OF THE DRAWINGS

FIG. 17 is a block diagram of a picture analyzer according to an alternate embodiment of the invention; and FIG. 18 is a two dimensional frequency response graph for illustrating the operation of the picture analyzer of FIG. 17.

In the drawings the same reference numerals refer to corresponding parts.

DESCRIPTION OF THE PREFERRED EMBODIMENTS

Figure 1:
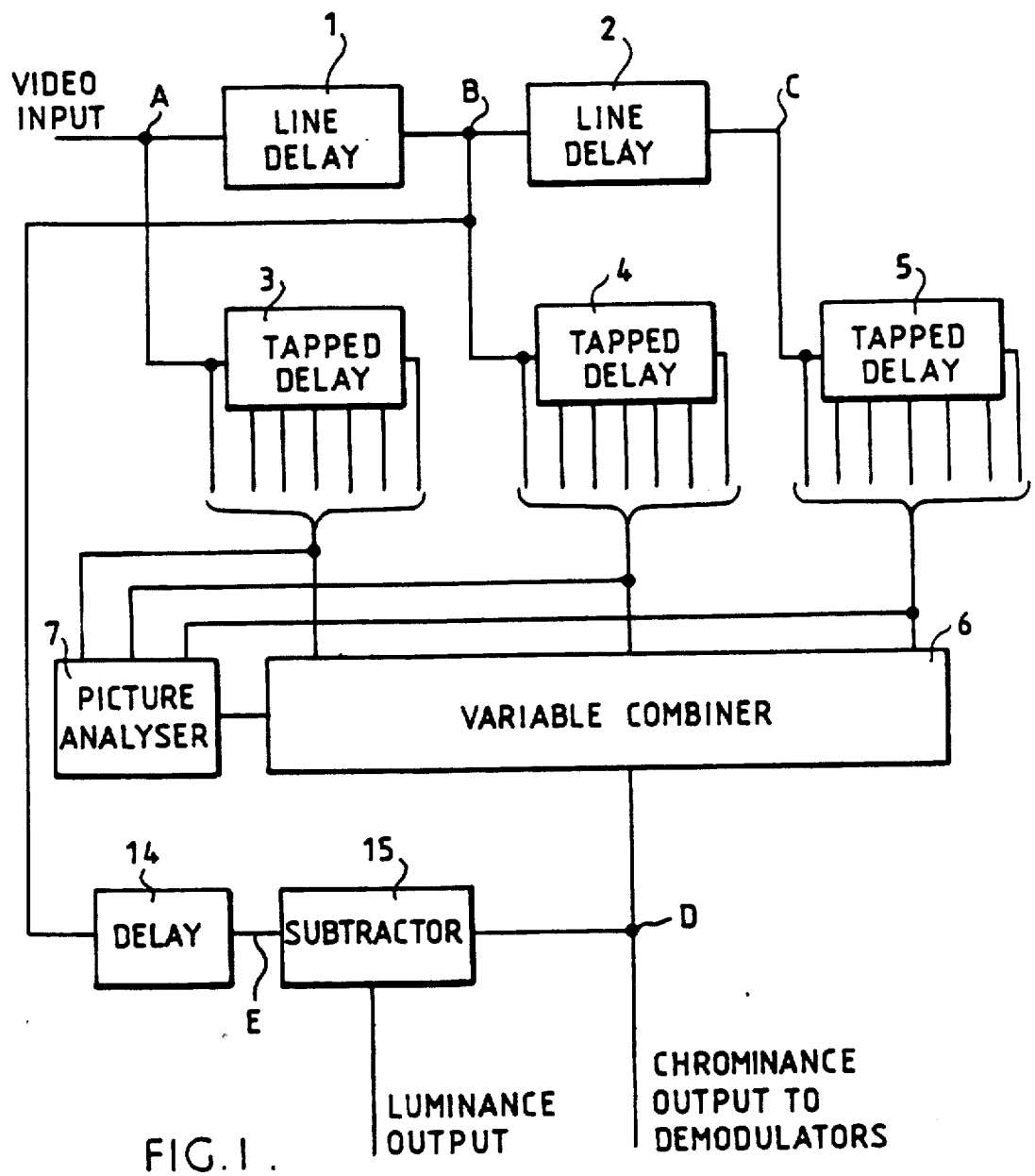
FIG. 1 is a block diagram of a first preferred embodiment of the invention.

FIG. 1 shows a colour television decoder for separating the chrominance and luminance signals from a video input signal of the type in which the chrominance signal shares the frequency spectrum occupied by the luminance signal. Conventional video signals of this type employ an interleaving technique such that a subcarrier frequency is quadrature-modulated by two colour difference signals with the frequency components of the modulated signal being interleaved with the frequency components of the luminance signal. There are presently two standards for such encoding, namely NTSC and PAL.

The decoder may be provided in a colour television receiver or monitor with the video input signal being supplied from a vision detector, the luminance signal being supplied to a matrixing circuit, and the chrominance signal being supplied to synchronous demodulators for supplying the colour difference signals to the matrixing circuit. Alternatively, the decoder may be used in other applications for processing, for instance prior to re-encoding in a different format.

There are various line and frame picture standards in use throughout the world, and the decoder may be used for any of these. For instance, the commonest NTSC encoding format operates at 60 fields per second interlaced to provide 30 frames per second with 525 lines in each frame. The commonest PAL encoding format uses 50 fields per second interlaced to provide 25 frames per second with 625 lines in each frame. For the purposes of illustration only, the following description will refer to the latter format.

The input video signal A is supplied to the input of a line delay 1 which provides a delay equal to one line period of the picture (64 micro seconds). The output B of the line delay 1 is supplied to the input of a second line delay 2 of identical type providing an output C. The signals A, B, and C thus refer to three picture points arranged vertically in three consecutive lines of the picture.

The signals A, B and C are supplied to the inputs of tapped delays 3, 4, and 5, respectively, each having a delay of between 0.5 and 2 micro seconds. The signals at the output taps of the delays 3, 4, and 5 represent picture points horizontally displaced along a displayed picture line and the immediately preceding and succeeding lines. Thus, the signals represent a two-dimensional pattern or array of picture points with the currently displayed picture point being substantially at the centre of the array.

The outputs of the tapped delay 3, 4 and 5 are supplied to a variable combiner 6 having an output for providing the output chrominance signal D of the decoder. The variable combiner 6 linearly combines the signals from the output taps of the tapped delays 3, 4 and 5 such that each signal is multiplied by a variable positive or negative coefficient and the resulting products are summed. The arrangement of delay lines and the variable combiner thus forms a variable two-dimensional finite impulse response filter. The response of the filter can be changed by varying the coefficient relating to each delay output to alter the amplitude and polarity thereof. The filter is normally used with a bandpass response to pass the chrominance signal while substantially rejecting the luminance signal. However, the variable combiner 6 can be controlled in such a way as to change the vertical, horizontal, or diagonal resolution of the chrominance signal.

The output taps of the tapped delays 3, 4, and 5 are also supplied to the inputs of a picture analyser 7. The picture analyser 7 is arranged to determine the picture content of the picture area represented by the array of picture points. For instance, the analyser can detect picture information such as vertical luminance information, the presence of colour., vertical or horizontal colour changes, and the like. The picture analyser 7 analyses this information and supplies suitable coefficient control signals to the variable combiner 6 so as to change the response of the filter in order to provide optimum separation of luminance and chrominance signals for each picture point.

The signal B is also supplied to a delay 14 arranged to provide a delay time so that the output signal E corresponds to the picture point currently being displayed, i.e. the centre of the array of picture points. Alternatively, one of the output taps of the tapped delay 4 may be able to provide the signal E. The signal E is supplied to one input of a subtractor 15, whose other input receives the chrominance signal D from the variable combiner 6. The subtractor 15 thus provides the luminance signal at its output.

Figure 2:
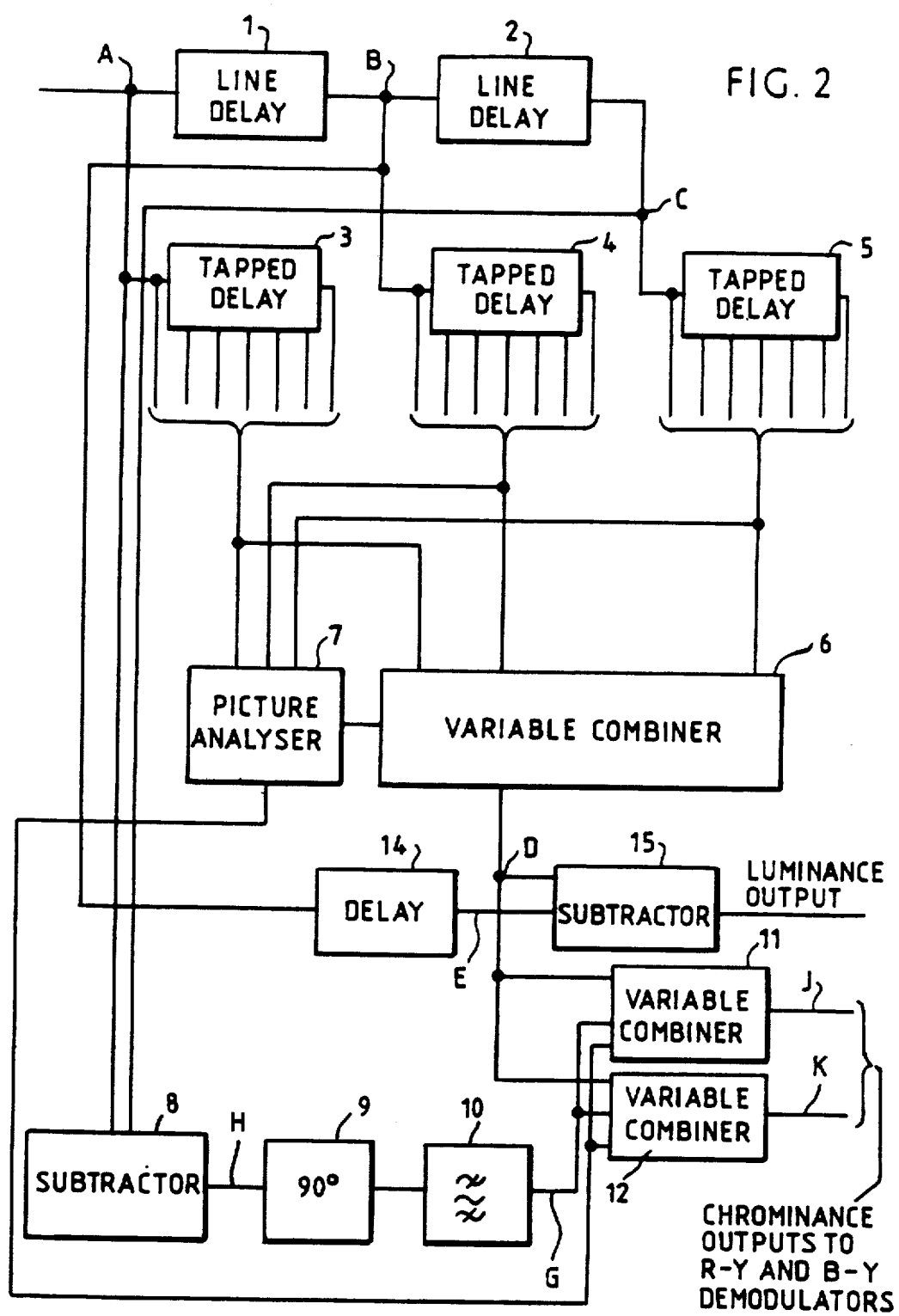
FIG. 2 is a block diagram of a second preferred embodiment of the invention.

The decoder shown in FIG. 2 comprises line delays 1 and 2, tapped delays 3, 4 and 5, a variable combiner 6, a picture analyser 7, a delay 14 and a subtractor 15 identical to or corresponding to those parts in FIG. 1. Accordingly, these parts will not be further described.

The decoder of FIG. 2 is intended for use with PAL encoded signals, and further comprises a subtractor 8 having first and second inputs which receive the signals A and C, respectively. The subtractor 8 forms the difference H between these signals and supplies this via a 90° phase shifter 9 to the input of a bandpass filter 10. The output G of the filter 10 is supplied to first inputs of variable combiners 11 and 12.

The output D of the variable combiner 6 is supplied to second inputs of the variable combiners 11 and 12. The variable combiners are controlled by a control signal supplied by the picture analyser 7.

The signal H from the subtractor 8 contains chrominance information which is shifted in phase by 90° in the phase shifter 9 and filtered in the bandpass filter 10 to provide a chrominance only signal G. The variable combiner 11 combines the signals D and G in variable proportions, under control of the picture analyser, to provide an output signal J equal to x D + (1 − x) G, where x is a variable coefficient between zero and one depending on the value of the control signals from the picture analyser 7. The variable combiner 12 combines the input signals D and G to produce an output signal K equal to x D − (1 − x) G. The output signals J and K from the variable combiners 11 and 12 are the completely or partially separated chrominance colour difference signals and may be supplied to conventional R - Y and B - Y demodulators. Thus, the variable combiners 11 and 12 may be controlled so as to allow the vertical chrominance response to be varied in accordance with the picture content.

Figure 3:
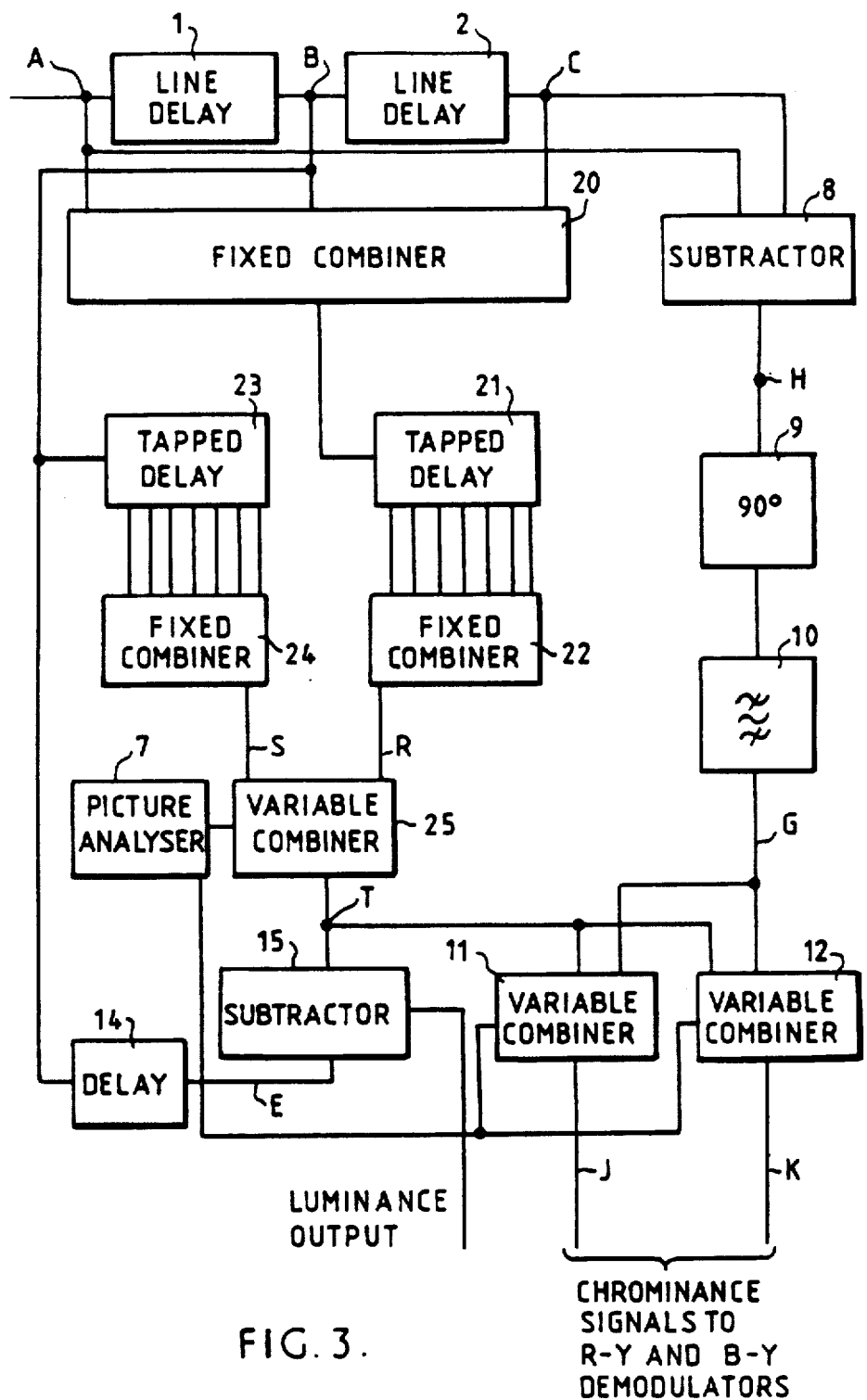
FIG. 3 is a block diagram of a third preferred embodiment of the invention.

The decoder shown in FIG. 3 is similar to that shown in FIG. 2 but the tapped delays 3, 4 and 5 and the variable combiner 6 of FIG. 2 are replaced by a fixed combiner 20, tapped delays 21 and 23, fixed combiners 22 and 24, and a variable combiner 25. The other parts of the decoder of FIG. 3 correspond to parts in FIG. 2 and will not be described further.

The signals A, B, and C are supplied to the inputs of the fixed combiner 20 where they are linearly combined with predetermined signs and in predetermined proportions. The output of the fixed combiner 20 is supplied to the input of the tapped delay 21, whose output taps are connected to the fixed of the input combiner 22 and to the picture analyser 7 (the input connections with the picture analyser 7 are not shown in FIG. 3 for the sake of clarity). The signal B is supplied to the input of the tapped delay 23, whose output taps are connected to the inputs of the fixed combiner 24 and to the picture analyser 7. As discussed in greater detail hereinbelow, the picture analyzer 7 also receives the signals A, B, and C as well as the output signals form the tapped delays 21 and 23. The output signals R and S of the fixed combiners 22 and 24 are supplied to the variable combiner 25, whose output signal T is supplied to the subtractor 15 and to the variable combiners 11 and 12.

The fixed combiner 20, the tapped delay 21, and the fixed combiner 22 provide a fixed two-dimensional filter arranged to pas the chrominance signals. The tapped delay 23 and the fixed combiner 24 provide a one-dimensional (horizontal) chrominance filter. The variable combiner combines the signals R and S in accordance with the ratio p R + (1−p) S, where p is a variable coefficient between 0 and 1 controlled by the picture analyser 7. The chrominance signal T is substantially free from luminance information, and the effective horizontal and vertical resolutions of this signal are defined by the fixed combiners 22 and 24 and the variable combiner 25.

Although the decoder of FIG. 3 is shown with the variable combiners 11 and 12 for use with a PAL encoded signal, the signal T may be used as the chrominance signal directly, for instance for NTSC encoded signals.

In a practical form of the decoder shown in FIG. 3, the fixed combiner 20 would combine proportions of the signals A, B, and C so that the output signal has a minimum response to vertical luminance signals and a maximum response to diagonal picture information. This may be achieved by forming the output signal equal to $B - \frac{1}{4} A - \frac{1}{4} C$. The delays provided by the tapped delay output taps and the linear combination formed by the combiner 22 are chosen to provide the signal R with a maximum response at the colour subcarrier frequency and a band width substantially equal to the band width of the chrominance signal. Similarly, the tapped delay 23 and the fixed combiner 24 are arranged to provide the signal S with a maximum response at the colour subcarrier frequency and a band width substantially equal to that of the chrominance signal, preferably, the band width of the tapped delay 23 and the fixed combiner 24 is lower than that of the tapped delay 21 and the combiner 22.

The signals R and S constitute two separated chrominance signals. The vertical response of the signal R is reduced because of the action of the vertical filter comprising the fixed combiner 20. The vertical response or resolution of the signal S is not restricted, but its horizontal response or resolution may be chosen to be restricted. The variable combiner 25 combines different proportions of the signals R and S so as to adjust the horizontal and vertical response of the chrominance output T in accordance with the control signal supplied by the picture analyser 7. Because the signal T is subtracted from the signal E, the luminance signal at the output of the subtractor 15 is also a function of the control signal of the picture analyser 7.

Figure 4:
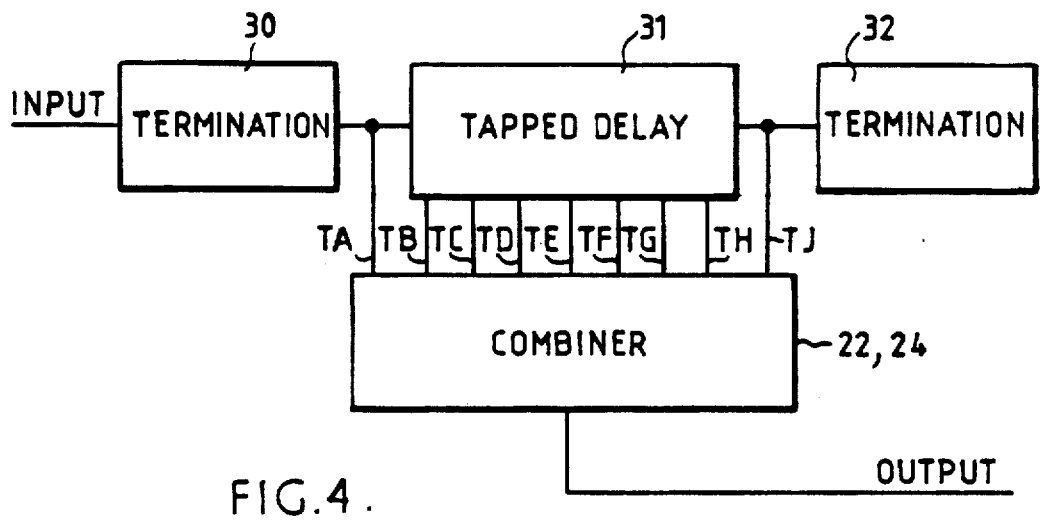
FIGS. 4 to 7 are block diagrams of delay lines suitable for use in the preferred embodiments.

The tapped delays 21 and 23 may be provided by a conventional type of inductive delay line of the type shown in FIG. 4. The input is connected via a suitable termination impedance 30 to the tapped delaY line 31, whose output is similarly provided with a suitable termination impedance 32. The impedances of the termination impedances 30 and 32 are matched to the impedance of the delay line 31 so as to avoid reflections. The outputs TA to TJ are connected to the inputs of the fixed combiner 22 or 24. The tapped delay line 31 conveniently provides a delay equal to a multiple of the period of the subcarrier frequency and the taps are conveniently spaced at multiples of half this period. In order to provide a filter response which is symmetrical about the colour subcarrier frequency, the coefficients of the linear combination in the combiner 22 or 24 are made symmetrical about the centre of the delay line so that the output of the combiner is equal to a A + b B + c C + d D + e E + d F + c G + b H + a J, where a, b, c, d, and e are fixed positive or negative constants defining the filter.

Figure 5:
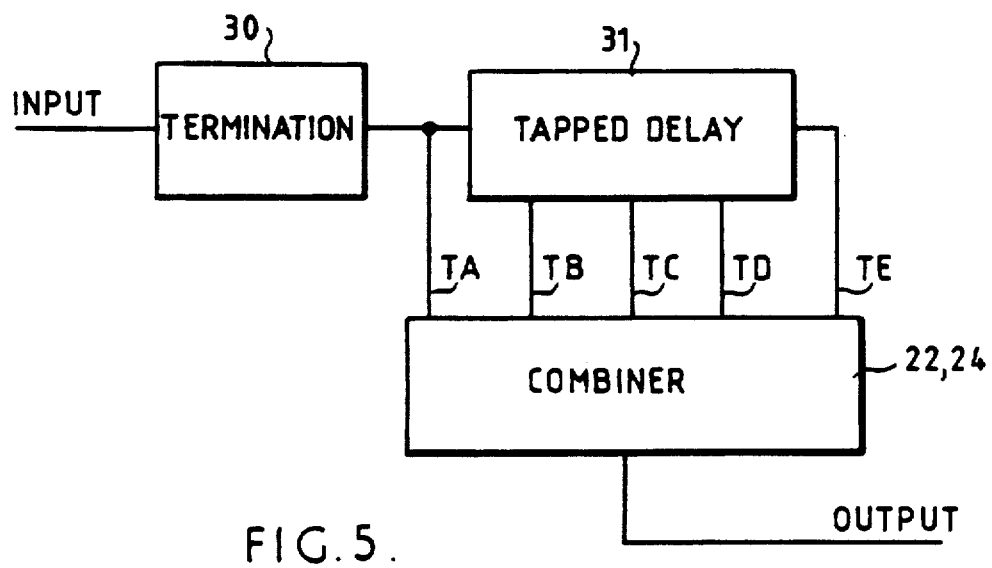

In order to provide such a symmetrical response, the tapped delay can be simplified as shown in FIG. 5 by using a delay line of half the length of that in FIG. 4 and terminating the output of the delay line in a high impedance instead of the characteristic impedance of the delay line, for instance by leaving the output open circuit. The signal is then reflected at the mis-matched impedance and, by providing the coefficients a, b, c, d, and e in the combiner, the same transfer function as that of the arrangement of FIG. 4 is provided by the arrangement of FIG. 5.

Figure 6:
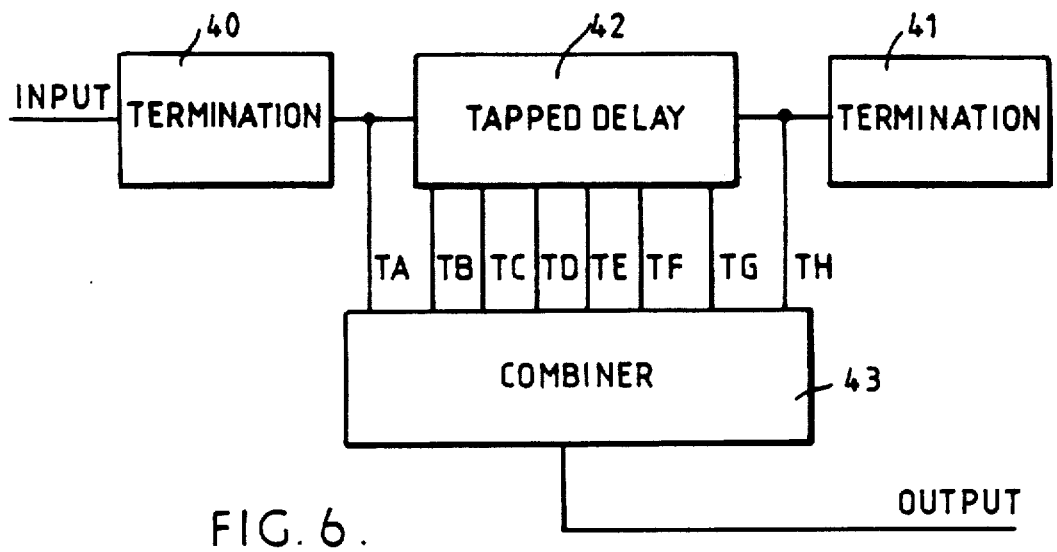

The phase shifter 9 and the filter 10 of the decoders shown in FIGS. 2 and 3 may be constituted by the arrangement shown in FIG. 6, which comprises input and output termination impedances 40 and 41, a tapped inductive delay line 42, and a fixed combiner 43. The delay line 42 has an even number of taps spaced by multiples of half the period of the subcarrier frequency. In this case, in order to provide a bandpass response with a 90° phase shift, coefficients a, b, c, and d are suitably choosen and the combiner performs the combination a A + h B + c C + d D − d E − c F − b G − a H, the coefficients thus being anti-symmetric with respect to magnitude and polarity about the centre of the delay line.

Figure 7:
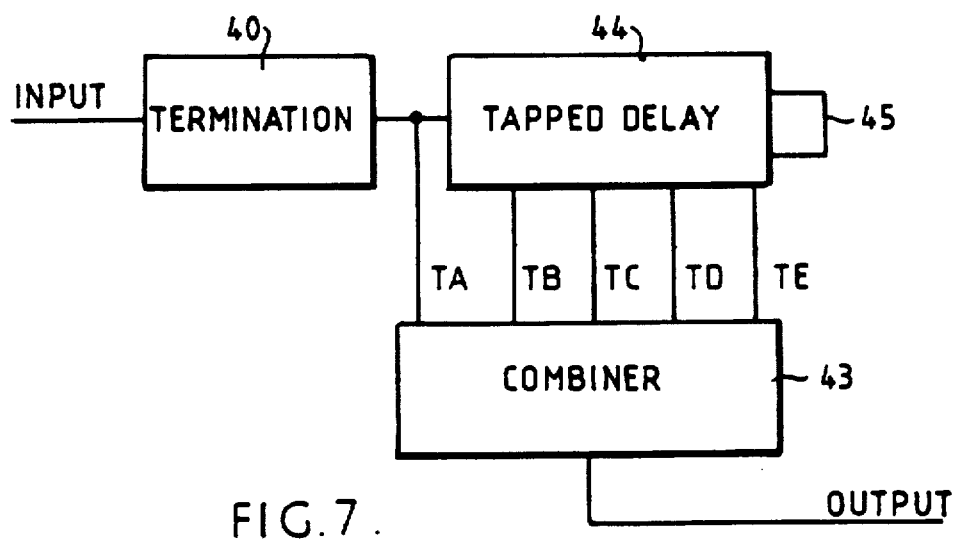

FIG. 7 illustrates an alternative arrangement to that of FIG. 6 allowing the use of a shorter delay line 44. The delay line taps are spaced by half the period of the subcarrier frequency with the final tap being spaced by a period of a quarter of the subcarrier frequency from the end of the delay line. The end of the delay line is terminated by a low impedance or short circuit 45 so that signals travelling down the delay line are reflected with inversion.

The picture analyser which will be described further below in connection with FIG. 8 may comprise one or more comb filters or two-dimensional spatial filters, together with rectifiers for measuring the outputs of the filter or filters. The purpose of the filters is to separate vertical and diagonal picture information at frequencies near to that of the colour subcarrier. The rectified outputs of the filters provide control signals to the variable combiner 25 depending on the picture information contained in the picture area covered by the array of picture points. The rise and fall times of the control signals are similar to the rise and fall times of the chrominance signal. The output of the picture analyser is arranged such that an increase in the amount of diagonal picture information, corresponding to frequencies near to (n + ½) fh where fh is the line frequency and n is a positive integer, increases the proportion of the signal S and correspondingly reduces the proportion of the signal R making up the signal T. Conversely, signals containing vertical picture information, corresponding to frequencies near to nfh, cause the proportion of the signal S to be reduced and the proportion of the signal R to be increased.

The response of the control signal to the picture information at different angles may be modified by the use of two or more filters and rectifiers with the outputs of the rectifiers combined, for instance added or subtracted, to form the final control signal for the variable combiner 25.

Figure 8:
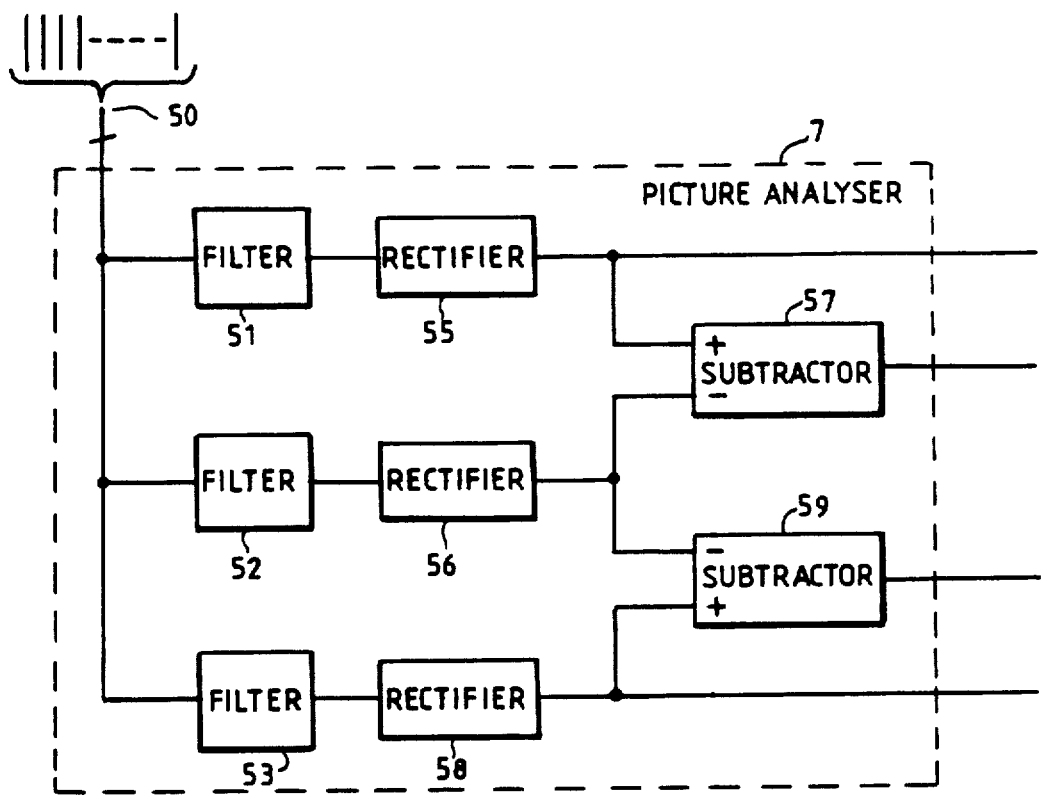
FIG. 8 is a block diagram of a picture analyser of the embodiments

FIG. 8 shows a form of the picture analyser 7 which is particularly suitable for use in the decoder of FIG. 3. The analyser receives at its input the signals A, B, and C and the signals from the output taps of the tapped delays 21 and 23 at an input 50. The input 50 is connected to first, second, and third filters 51 to 53 respectively. Each of the filters 51 to 53 comprises a two-dimensional finite impulse response filter provided by a fixed combiner similar to the fixed combiner 22 and 24, with coefficients selected so as to provide the desired response.

Figure 9:
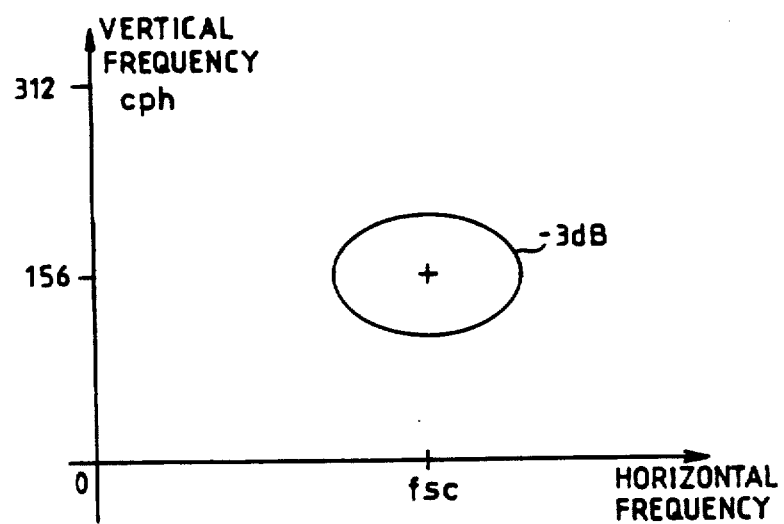
FIGS. 9 to 13 are two dimensional frequency response graphs showing vertical spatial frequency against horizontal spatial frequency for illustrating operation of the picture analyser of FIG. 8.

The first filter 51 has a two dimensional bandpass response of the type illustrated in FIG. 9, which is a graph of vertical spatial frequency in cycles per picture height against horizontal frequency in megahertz. The first filter 51 has a peak response or centre frequency at a horizontal frequency near to the subcarrier frequency and a vertical frequency of about 156 cycles per picture height. This corresponds to diagonal picture information. The output of the filter 51 is rectified by a rectifier 55. Although this signal could be used to control the variable combiner 25, it is preferred to subject it to further processing as follows.

Figure 10:
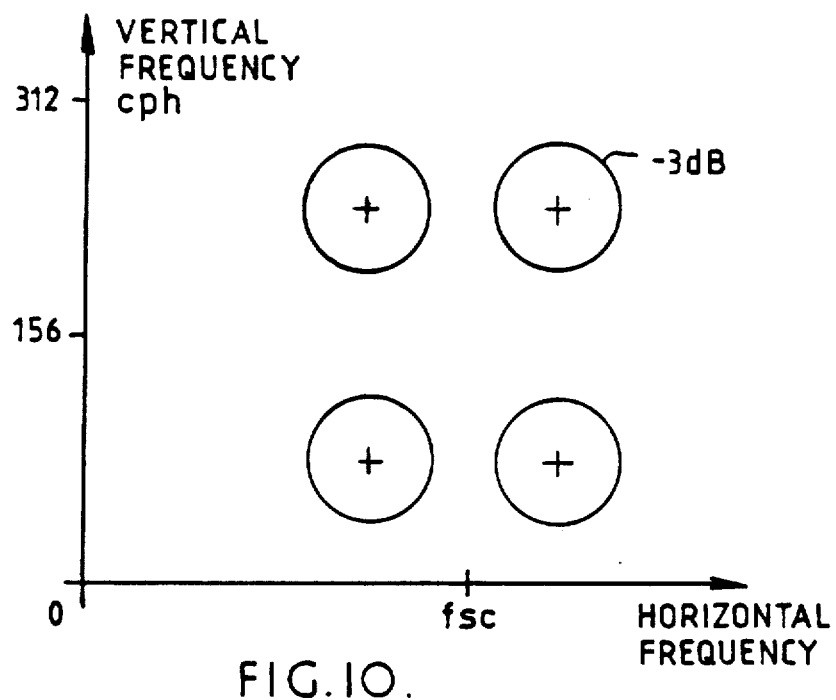

The filter 52 is a quadruple bandpass filter having four peaks as illustrated in FIG. 10. The centre frequencies of the four peaks are offset from the centre frequency of the filter 51 horizontally by + and − one megahertz, and are located approximately at 78 and 235 cycles per picture height. The output of the filter 52 is rectified by a rectifier 56 and supplied to one input of a subtractor 57 whose other input is connected to the output of the rectifier 55. The effect of this is to modify the response shown in FIG. 9 to the response shown in FIG. 11, which improves the control of the variable combiner by enhancing the detection of vertical and horizontal edges of coloured picture areas.

The action of the variable combiners 11 and 12 is to modify further the vertical and horizontal response of the decoder to PAL encoded signals. The vertical band width of the chrominance signal is reduced as the contribution from the signal G to the output signals J and K is increased. In a further refinement, the filter 10 may be designed such that, as the vertical band width is reduced, the horizontal band width increases.

The variable combiner 25 and the picture analyser 7 cooperate such that, in the presence of vertical picture information, the contribution of the signal T to the signals J and K is increased whereas, as diagonal picture information increases, the contribution of signal G increases.

Figure 12:
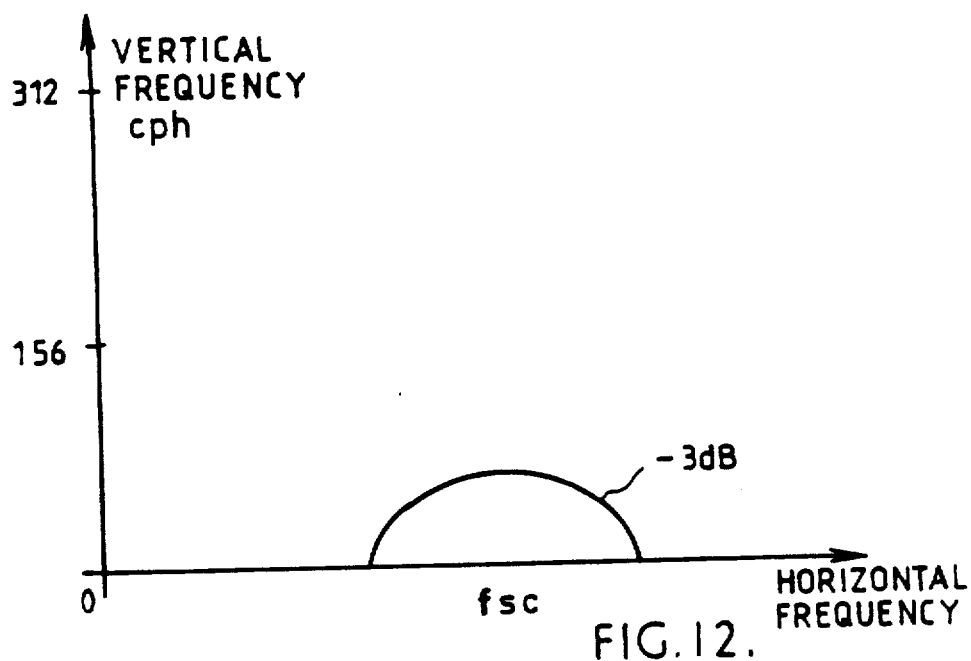
Figure 13:
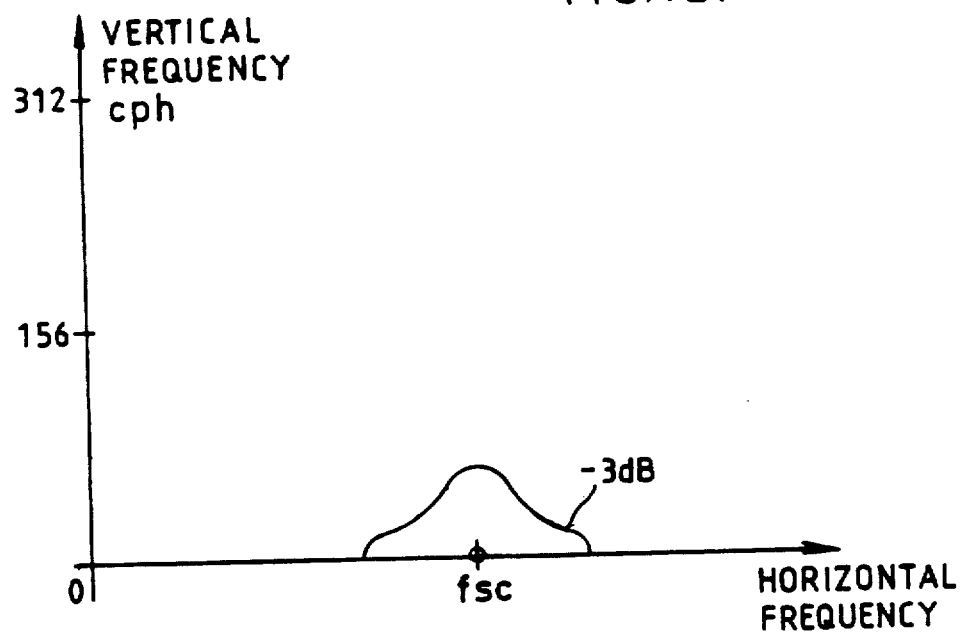

In a particularly simple form of the decoder, the control signal, for instance at the output of the rectifier 55 or at the output of the subtractor 57, for the variable combiner 25 may be also be used to control the variable combiners 11 and 12. However, it has been found preferable to provide a different control signal for the combiners 11 and 12. For this purpose, the filter 53 has a bandpass response with a peak response or centre frequency at a horizontal frequency near to the subcarrier frequency and a vertical frequency of zero, as shown in FIG. 12. The output of the filter 53 is rectified by a rectifier 58, whose output signal may be used to control the variable combiners 11 and 12 so as to increase the contribution of the signal T. However, it is preferred to provide a subtractor 59 whose first input receives the output of the rectifier 58 and whose second input receives the output of the rectifier 56. This provides a combined response as shown in FIG. 13. It should be noted that only the two lower peaks contribute to this modified response so that it is possible to use a separate filter having only the two lower peaks in FIG. 10, followed by a rectifier such rectifier being connected to the second input of the subtractor 59 instead of the rectifier 56. This arrangement improves the vertical chrominance resolution and reduces cross-colour.

In the arrangement of FIG. 17, a further control signal is obtained by providing a fourth two dimensional bandpass filter 60 having a passband as illustrated in FIG. 18. A rectifier 61 rectifies the output of the filter 60. A subtractor 62 receives the outputs of the rectifiers 58 and 61 and provides the further control signal at its output. The output passband of subtractor 62 may be similar to that of the subtractor 59 (illustrated in FIG. 13), as a result of subtracting the passband of filter 60 (FIG. 17) from the passband of filter 53 (FIG. 12).

It should be noted that not all the filters and other components shown in FIGS. 8 and 17 need be present to obtain an operable picture analyzer, as discussed above and as pointed out in the accompanying claims.

Figure 11:
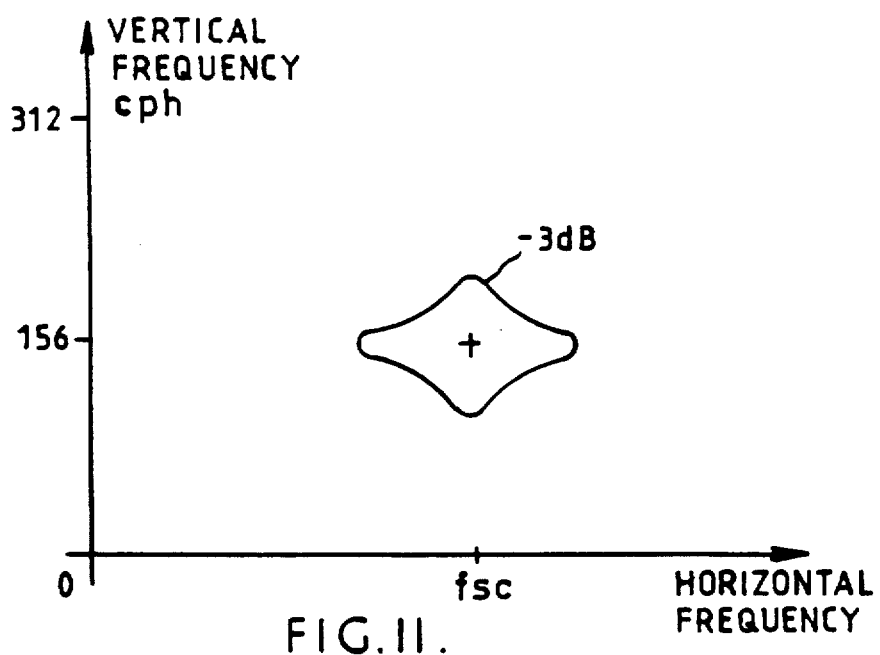
Figure 14:
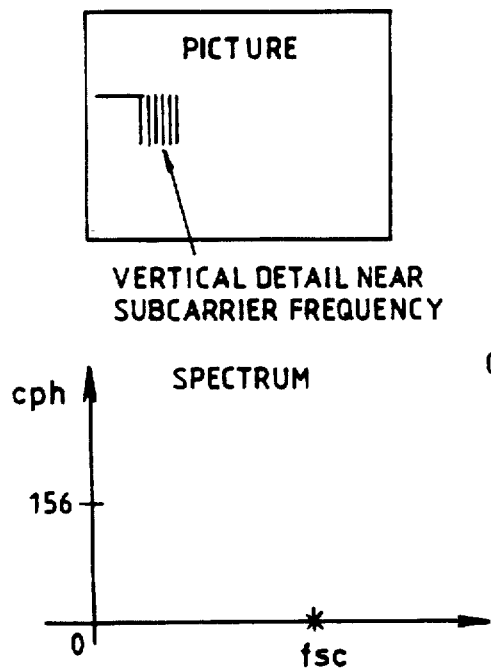
FIGS. 14 to 16 each show diagrammatically a picture detail and graphically the corresponding two dimensional signal spectrum.
Figure 15:
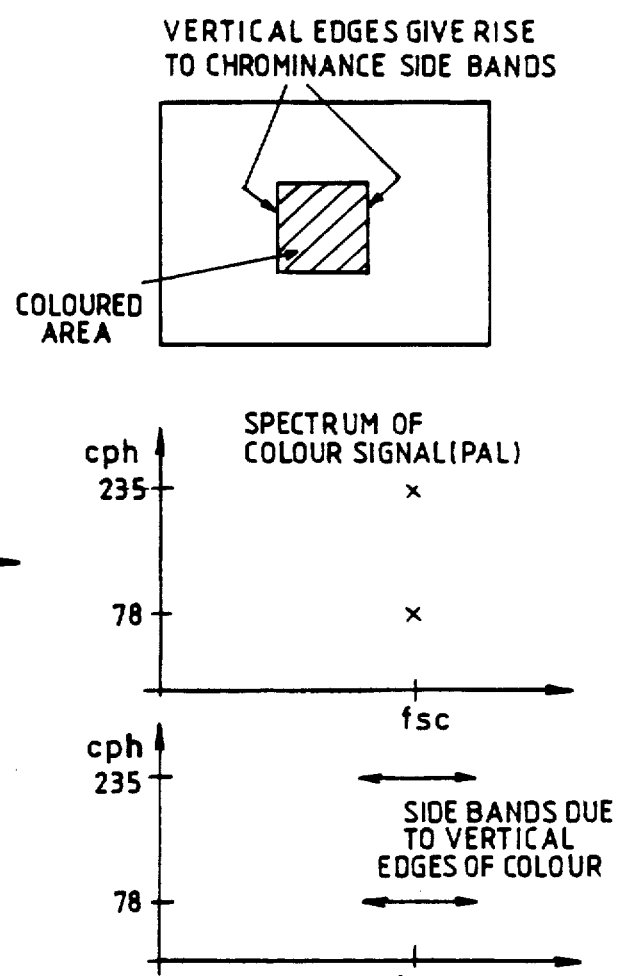
Figure 16:
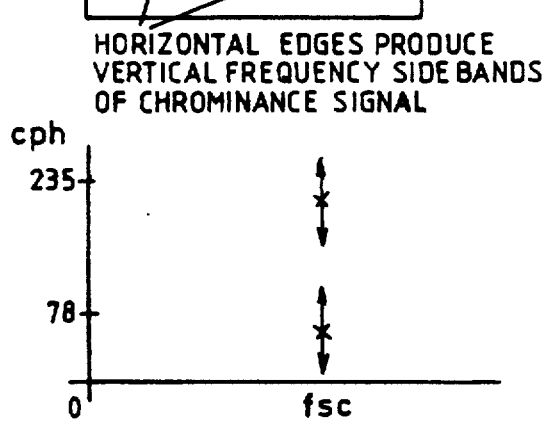

FIGS. 14 to 16 illustrate the operation of the decoder of FIG. 3 incorporating the picture analyser 7 of FIG. 8 and serve to illustrate its operation in response to certain picture configurations. The upper part of FIG. 14 illustrates a picture having vertical detail at near to the subcarrier frequency, and the lower part of FIG. 14 shows the spectrum of this signal. The filter response shown in FIG. 11 is such that the control signal from the subtractor 57 is low. The variable combiner 25 therefore mainly passes the signal R to form the signal T. The signals A, B, and C are substantially equal, and the vertical filtering action of the combiner 20 provides a substantially zero signal R. The luminance signal from the subtractor 15 is therefore substantially equal to the signal E, which is the delayed signal B.

Because the signal illustrated in FIG. 14 falls substantially at the centre frequency of the response shown in FIG. 13, the output signals from the subtractor 59 is high and the signal J and K is mainly derived from the signal T. Thus, cross-colour is greatly reduced.

FIG. 15 illustrates horizontal scanning through a coloured area encountering vertical edges of this coloured area. The middle part of FIG. 15 shows the spectrum of the signal from the coloured area itself, comprising two discrete signals of the same horizontal frequency. The lower part of FIG. 15 shows the spectrum for the vertical edges which provide side band signals displaced vertically. The side bands fall within the pass band of the filter response of FIG. 10 which reduces the level of the control signal from the subtractor 57 to the variable combiner 20. As a result, the contribution of the signal R to the signal T is increased, thus increasing the horizontal chrominance band width However, the control signal at the output of the subtractor 59 is reduced, thus increasing the contribution of the signal G to the signals J and K, providing maximum horizontal chrominance band width and reduced vertical band width.

The upper part of FIG. 16 illustrates a similar coloured area to that shown in FIG. 15 but this time with respect to the horizontal edges. As shown in the lower part of FIG. 16, scanning of the horizontal edges produces vertical side bands of the chrominance signal falling within the pass bands of the filters 51 and 52 (FIGS. 9 and 11). The contribution of the signal S to the signal T is therefore increased and the vertical response of the chrominance signal is enhanced, thus giving improved vertical band width of the chrominance signal. The subtractor 15 removes the vertical side bands from the luminance signal. Also, the contribution of the signal T to the signals J and K is increased so as to improve the vertical chrominance resolution.

What is claimed is:

1. A colour television decoder comprising:
    continuously variable two dimensional finite impulse response filter means having a variable vertical response whereby said filter means can operate as a two dimensional filter and can approximate the operation of a one dimensional filter, said filter means having an input for receiving an input colour video signal representing picture information and having an output for supplying chrominance signals;
    said continuously variable two dimensional finite impulse response filter means comprising:
        first delay means coupled to said input for providing a plurality of signals representing a two dimensional pattern of picture points;
        first variable combining means for linearly combining the plurality of signals; and
        first control means for continuously controlling the first variable combining means, said first control means including a fixed two dimensional filter having a diagonal response that controls the vertical response of the two dimensional filter means by determining proportions of the plurality of signals to be combined in accordance with the picture information.

2. A decoder as claimed in claim 1, wherein said first control means measures at least diagonal picture information in said plurality of signals representing a two dimensional pattern of picture points for controlling the first variable combining means.

3. A decoder as claimed in claim 2, wherein said first control means detects said diagonal picture information and reduces the vertical bandwidth of the variable two-dimensional filter.

4. A decoder as claimed in claim 3, wherein said first control means simultaneously increases the horizontal bandwidth of the variable two-dimensional filter.

5. A decoder as claimed in claim 1, further comprising second delay means for delaying the input colour video signal and having an output, and first subtracting means having a first input connected to said output of said variable two dimensional finite impulse response filter, a second input connected to said output of said second delay means, and an output for supplying a luminance signal.

6. A decoder as claimed in claim 5, wherein said filter means is a continuously variable two-dimensional finite impulse response filter, in which said first delay means includes:
    a first delaying circuit for providing a delay equal to one line period of the input colour video signal and having an input for receiving the input colour video signal and an output, and
    a second delaying circuit for providing a delay equal to one line period of the input colour video signal and having an input connected to said output of said first delaying circuit and an output.

7. A decoder as claimed in claim 5, wherein the input to the second delay means is connected to the output of the first delaying circuit.

8. A decoder as claimed in claim 6, wherein said first delaying circuit further comprises:
    first, second and third tapped delay lines having inputs connected respectively to said input colour video signal, the output of said first delaying circuit, and the output of said second delaying circuit; each said tapped delay line having a plurality of output taps; and said first variable combining means comprises a variable combining circuit having a plurality of inputs connected to said output taps of said first, second and third tapped delay lines, and an output which provides said output of the variable two-dimensional finite impulse response filter to said first input of said first subtracting means.

9. A decoder as claimed in claim 8, wherein said first control means comprises a picture analyzer which has a plurality of inputs connected to said output taps of said first, second and third tapped delay lines, and an output which provides a control signal for continuously controlling said first variable combining means to vary the vertical response of the two-dimensional filter.

10. A decoder as claimed in claim 6, wherein said first delaying circuit further comprises:
   a first fixed combining circuit having inputs connected respectively to said input colour video signal, the output of said first delaying circuit, and the output of said second delaying circuit; and having an output;
   first and second tapped delay lines receiving respectively said output of said first delaying circuit and said output of said first fixed combining circuit; each of said first and second tapped delay lines having a plurality of output taps;
   second and third fixed combining circuits each having a plurality of inputs connected respectively to said pluralities of output taps of said first and second tapped delay lines, and respective outputs; and
   a variable combining circuit receiving said outputs of said second and third fixed combining circuits, and having an output which provides said output of the variable two-dimensional finite impulse response filter to said first input of said first subtracting means.

11. A decoder as claimed in claim 10, said decoder further comprising: second subtracting means having a first input connected to said input of said first delaying circuit, a second input connected to said output of said second delaying circuit, and an output,
   phase shifting means having an input connected to said output of said second subtracting means and an output,
   second and third variable combining means each having a first input connected to said output of said variable two dimensional finite impulse response filter, a second input connected to said output of said phase shifting means, and a control input for receiving a control signal, and
   second control means having an output connected to said control input of said second and third variable combining means for controlling said second and third variable combining means in accordance with the picture information.

12. A decoder as claimed in claim 11, wherein said phase shifting means comprises a 90° phase shifter followed in series by a bandpass filter.

13. A decoder as claimed in claim 11, wherein said first and second control means comprise a picture analyzer which has a plurality of inputs connected to said output taps of said first, second and third tapped delay lines, and an output which provides a control signal.

14. A decoder as claimed in claim 13, in which said first and second control means comprises a first two dimensional bandpass filter having a first pass band centred on predetermined horizontal and vertical spatial frequencies and having an output, and a first rectifier having an input connected to said output of said first two dimensional bandpass filter and having an output.

15. A decoder as claimed in claim 14, in which said first and second control means further comprises a quadruple second two dimensional bandpass filter having an output and having second, third, fourth and fifth pass bands, a second rectifier having an input connected to said output of said quadruple two dimensional bandpass filter and having an output, and third subtracting means having a first input connected to said output of said first rectifier and a second input connected to said output of said second rectifier, the second and third pass bands having a horizontal centre frequency less than that of the first pass band and the fourth and fifth pass bands having a horizontal centre frequency greater than that of the first pass band, the second and fourth pass bands having a vertical centre frequency less than that of the first pass band and the third and fifth pass bands having a vertical centre frequency greater than that of the first pass band.

16. A decoder as claimed in claim 13, claim 14 or claim 15, in which said first and second control means further comprises a third two dimensional bandpass filter having a sixth pass band centred on a predetermined horizontal spatial frequency and zero vertical spatial frequency and having an output, and a third rectifier having an input connected to said output of said second two dimensional bandpass filter and having an output.

17. A decoder as claimed in claim 16, in which said first and second control means further comprises a double fourth two dimensional bandpass filter having seventh and eighth pass bands and having an output, a fourth rectifier having an input connected to said output of said double two dimensional bandpass filter and having an output, and fifth subtracting means having a first input connected to said output of said third rectifier and a second input connected to said output of said fourth rectifier, the seventh and eighth pass bands having a non-zero vertical centre frequency, the seventh pass band having a horizontal centre frequency less than that of the sixth pass band and the eighth pass band having a horizontal centre frequency greater than that of the sixth pass band.

18. A decoder as claimed in claim 14, wherein said output of said first rectifier supplies said control signal to said first variable combining means.

19. A decoder as claimed in claim 18, wherein said output of said first rectifier also supplies said control signal to said second and third variable combining means.

20. A decoder as claimed in claim 15, wherein said output of said third subtracting means also supplies said control signal to said second and third variable combining means.

21. A decoder as claimed in claim 20, wherein said output of said third subtracting means also supplies said control signal to said second and third variable combining means.

22. A decoder as claimed in claim 16, wherein said output of said third rectifier supplies said control signal to said second and third variable combining means.

23. A decoder as claimed in claim 22, wherein said output of said first rectifier supplies said control signal to said first variable combining means.

24. A decoder as claimed in claim 22, wherein said output of said third subtracting means supplies said control signal to said first variable combining means.

25. A decoder as claimed in claim 16, further comprising fourth subtracting means having a first input connected to said output of said second rectifier and a second input connected to said output of said third rectifier and having an output.

26. A decoder as claimed in claim 25, wherein said output of said fourth subtracting means supplies said control signal to said second and third variable combining means.

27. A decoder as claimed in claim 26, wherein said output of said first rectifier supplies said control signal to said first variable combining means.

28. A decoder as claimed in claim 26, wherein said output of said third subtracting means supplies said control signal to said first variable combining means.

29. A colour television decoder comprising:
continuously variable two dimensional finite impulse response filter means having a variable vertical response whereby said filter means can operate as a two dimensional filter and can approximate the operation of a one dimensional filter, said filter means having an input for receiving an input colour video signal representing picture information and having an output for supplying chrominance signals;

said continuously variable two dimensional finite impulse response filter means comprising:

first delay means coupled to said input for providing a plurality of signals representing a two dimensional pattern of picture points;

first variable combining means for linearly combining the plurality of signals;

first control means for continuously controlling the first variable combining means by determining proportions of the plurality of signals to be combined in accordance with the picture information;

second delay means for delaying the input colour video signal and having an output; and first subtracting means having a first input connected to said output of said variable two dimensional finite impulse response filter, a second input connected to said output of said second delay means, and an output for supplying a luminance signal;

in which said first delay means includes: a first delaying circuit for providing a delay equal to one line period of the input colour video signal and having an input for receiving the input colour video and an output, and a second delaying circuit for providing a delay equal to one line period of the input colour video signal and having an input connected to said output of said first delaying circuit and an output, said decoder further comprising: second subtracting means having a first input connected to said input of said first delaying circuit, a second input connected to said output of said second delaying circuit, and an output, phase shifting means having an input connected to said output of said second subtracting means and an output, second and third variable combining means each having a first input connected to said output of said variable two dimensional finite impulse response filter, a second input connected to said output of said phase shifting means, and a control input, and second control means having an output connected to said control input of said second and third variable combining means for controlling said second and third variable combining means in accordance with the picture information.

* * * * *